US012043517B2

(12) United States Patent
Li et al.

(10) Patent No.: US 12,043,517 B2
(45) Date of Patent: Jul. 23, 2024

(54) AUTHORIZATION MANAGEMENT AND AUTHORIZATION REQUEST OF ELEVATOR SERVICE REQUEST

(71) Applicant: Otis Elevator Company, Farmington, CT (US)

(72) Inventors: Kai Li, Shanghai (CN); Siqi Ma, Shanghai (CN); Yang Yang, Shanghai (CN); Haofeng Hou, Shanghai (CN)

(73) Assignee: OTIS ELEVATOR COMPANY, Farmington, CT (US)

( * ) Notice: Subject to any disclaimer, the term of this patent is extended or adjusted under 35 U.S.C. 154(b) by 1401 days.

(21) Appl. No.: 16/518,671

(22) Filed: Jul. 22, 2019

(65) Prior Publication Data

US 2020/0031616 A1 Jan. 30, 2020

(30) Foreign Application Priority Data

Jul. 27, 2018 (CN) ......................... 201810845119.7

(51) Int. Cl.
*B66B 1/46* (2006.01)
*B66B 1/34* (2006.01)

(52) U.S. Cl.
CPC ............ *B66B 1/468* (2013.01); *B66B 1/3461* (2013.01); *B66B 2201/4638* (2013.01); *B66B 2201/4653* (2013.01); *B66B 2201/4676* (2013.01)

(58) Field of Classification Search
CPC .................. B66B 1/468; B66B 1/3461; B66B 2201/4638; B66B 2201/4653; B66B 2201/4676
See application file for complete search history.

(56) References Cited

U.S. PATENT DOCUMENTS 5,952,626 A 9/1999 Zaharia
9,957,132 B2 5/2018 Berryhill
(Continued)

FOREIGN PATENT DOCUMENTS

CN 1178839 C 12/2004
CN 102216187 A 10/2011
(Continued)

OTHER PUBLICATIONS

European Search Report for application EP 19188945, dated Dec. 6, 2019, 7 pages.
(Continued)

*Primary Examiner* — Jeffrey Donels
(74) *Attorney, Agent, or Firm* — CANTOR COLBURN LLP

(57) ABSTRACT

An authorization management and authorization request of an elevator service request pertaining to the technical field of elevator management. The system for authorization management of the elevator service request includes a wireless signal device and an authorization management device, the wireless signal device being used for broadcasting an elevator identifier of a corresponding elevator system; the system for authorization management obtains the elevator identifier broadcasted by the wireless signal device through a personal mobile terminal; the authorization management device is used to receive authorization request information from the personal mobile terminal, the authorization request information containing a terminal identifier of the personal mobile terminal and the elevator identifier of the corresponding elevator system obtained by the personal mobile terminal.

18 Claims, 2 Drawing Sheets

(56) References Cited

U.S. PATENT DOCUMENTS

| | | | | |
|---|---|---|---|---|
| 9,998,581 | B1 * | 6/2018 | Noxon | B66B 1/468 |
| 2017/0175020 | A1 | 6/2017 | Factor et al. | |
| 2018/0162688 | A1 | 6/2018 | Troesch et al. | |
| 2018/0346283 | A1 * | 12/2018 | Scoville | H04W 4/023 |
| 2019/0026445 | A1 * | 1/2019 | Ginsberg | H04L 9/0894 |
| 2019/0084794 | A1 * | 3/2019 | Scoville | B66B 1/3453 |
| 2019/0276273 | A1 * | 9/2019 | Zhang | B66B 1/468 |
| 2019/0276275 | A1 * | 9/2019 | Yang | B66B 5/0087 |

FOREIGN PATENT DOCUMENTS

| | | | | |
|---|---|---|---|---|
| CN | 202717457 | U | 2/2013 | |
| CN | 103492299 | A | 1/2014 | |
| CN | 104724558 | A | 6/2015 | |
| CN | 105189325 | A | 12/2015 | |
| CN | 105197704 | A | 12/2015 | |
| CN | 105960372 | A | 9/2016 | |
| CN | 106219334 | A | 12/2016 | |
| CN | 206032926 | U | 3/2017 | |
| CN | 107265215 | A | 10/2017 | |
| CN | 105540361 | B | 11/2017 | |
| CN | 107758457 | A | 3/2018 | |
| CN | 107765845 | A | 3/2018 | |
| CN | 107765846 | A | 3/2018 | |
| EP | 2953878 | A1 | 12/2015 | |
| EP | 3290374 | A1 | 3/2018 | |
| EP | 3348505 | A1 * | 7/2018 | B66B 1/06 |
| EP | 3348507 | A1 | 7/2018 | |
| EP | 3348507 | A1 * | 7/2018 | B66B 1/3461 |
| EP | 3412612 | A1 * | 12/2018 | B66B 1/14 |
| KR | 20060019182 | A | 3/2006 | |
| KR | 200420341 | Y1 | 6/2006 | |
| WO | 2005053178 | A1 | 6/2005 | |
| WO | 2010069347 | A1 | 6/2010 | |
| WO | 2017175021 | A1 | 10/2017 | |
| WO | 2018039827 | A1 | 3/2018 | |
| WO | WO-2018039827 | A1 * | 3/2018 | |

OTHER PUBLICATIONS

Indian Examination Report for Application No. 201914029143; Issued Mar. 17, 2021; 6 Pages.

* cited by examiner

AUTHORIZATION MANAGEMENT AND AUTHORIZATION REQUEST OF ELEVATOR SERVICE REQUEST

CROSS-REFERENCE TO RELATED APPLICATION

This application claims priority from Chinese patent application No. 201810845119.7, filed on Jul. 27, 2018, the entirety of which is hereby incorporated by reference herein and forms a part of the specification.

FIELD OF THE INVENTION

The present invention pertains to the technical field of elevator management, and it relates to authorization management and authorization request of an elevator service request, in particular to a system and a method for authorization management of an elevator service request, a personal mobile terminal and an authorization request method for an elevator service request.

BACKGROUND OF THE INVENTION

With the development of elevator technology, various technologies have emerged to automatically implement elevator service request operations through personal mobile terminals such as smart phones. However, in order to facilitate management of elevators, not every passenger has the right to send elevator service request commands to the elevator system through the personal mobile terminal. Generally, only authorized personal mobile terminals can send elevator service request commands to the elevator system.

At present, the right of access to an elevator system or a specific elevator is authorized to passengers one by one by an administrator in a face-to-face manner, and access certificates, such as PVC cards, with the right of access to corresponding elevators are issued to the passengers after passing authorization.

SUMMARY OF THE INVENTION

According to a first aspect of the present invention, a system for authorization management of an elevator service request is provided, which comprises: a wireless signal device for broadcasting an elevator identifier of a corresponding elevator system; and an authorization management device; wherein the system for authorization management obtains the elevator identifier broadcasted by the wireless signal device through a personal mobile terminal; the authorization management device is used to receive authorization request information from the personal mobile terminal, the authorization request information containing a terminal identifier of the personal mobile terminal and the elevator identifier of the corresponding elevator system obtained by the personal mobile terminal.

The system for authorization management according to one embodiment of the present invention obtains the elevator identifier broadcasted by the wireless signal device through a shaking operation of the personal mobile terminal.

In the system for authorization management according to another embodiment or any of the above embodiments of the present invention, the personal mobile terminal triggers a wireless signal scanning operation when the shaking operation occurs so as to obtain the elevator identifier broadcasted by the wireless signal device.

In the system for authorization management according to another embodiment or any of the above embodiments of the present invention, the authorization management device comprises: a receiving unit configured to receive the authorization request information from one or more personal mobile terminals, wherein the authorization request information contain the elevator identifier and the terminal identifier of the personal mobile terminal mapped to the elevator identifier; and an authorization management unit configured to determine whether the authorization request information from the corresponding personal mobile terminal is allowed to be authorized at least according to the mapping relationship between the elevator identifier and the terminal identifier in the authorization request information.

In the system for authorization management according to another embodiment or any of the above embodiments of the present invention, the authorization management device is configured to be able to return an authorization result corresponding to the authorization request information to the personal mobile terminal.

In the system for authorization management according to another embodiment or any of the above embodiments of the present invention, the personal mobile terminal stores the authorization result and is further used for determining whether the elevator system corresponding to the currently obtained elevator identifier has been authorized based on the authorization result and, in the case of determining that authorization has been granted, not generating or sending authorization request information corresponding to the currently obtained elevator identifier.

In the system for authorization management according to another embodiment or any of the above embodiments of the present invention, the authorization management device is further used to determine whether the authorization request information is an invalid request.

In the system for authorization management according to another embodiment or any of the above embodiments of the present invention, the wireless signal device is further used to establish a wireless connection with the personal mobile terminal to receive elevator service request commands from the personal mobile terminal.

According to a second aspect of the present invention, a method for authorization management of an elevator service request is provided, which comprises the steps of: broadcasting, by a wireless signal device, an elevator identifier of an elevator system corresponding to the wireless signal device; obtaining the elevator identifier broadcasted by the wireless signal device through a personal mobile terminal; and receiving authorization request information from the personal mobile terminal, wherein the authorization request information contain a terminal identifier of the personal mobile terminal and the elevator identifier of the corresponding elevator system obtained by the personal mobile terminal.

The method for authorization management according to one embodiment of the present invention, wherein in the step of obtaining the elevator identifier, the elevator identifier broadcasted by the wireless signal device is obtained through the shaking operation of the personal mobile terminal.

The method for authorization management according to another embodiment or any of the above embodiments of the present invention further comprises the step of generating and sending the authorization request information by the personal mobile terminal.

The method for authorization management according to another embodiment or any of the above embodiments of the present invention, wherein the step of obtaining the elevator identifier includes triggering the personal mobile terminal to perform a wireless signal scanning operation when the shaking operation occurs so as to obtain the elevator identifier broadcasted by the wireless signal device.

The method for authorization management according to another embodiment or any of the above embodiments of the present invention further comprises the step of determining whether the authorization request information from the corresponding personal mobile terminal is allowed to be authorized at least according to the mapping relationship between the elevator identifier and the terminal identifier in the authorization request information.

The method for authorization management according to another embodiment or any of the above embodiments of the present invention further comprises the step of returning an authorization result corresponding to the authorization request information to the personal mobile terminal.

The method for authorization management according to another embodiment or any of the above embodiments of the present invention further comprises the step of determining whether the elevator system corresponding to the currently obtained elevator identifier has been authorized based on the authorization result stored in the personal mobile terminal, and, in the case of determining that authorization has been granted, not generating or sending authorization request information corresponding to the currently obtained elevator identifier.

The method for authorization management according to another embodiment or any of the above embodiments of the present invention further includes the step of determining whether the authorization request information is an invalid request.

According to a third aspect of the present invention, an authorization request method for an elevator service request is provided, which comprises the steps of: obtaining, by the personal mobile terminal, the elevator identifier, broadcasted by a wireless signal device, of the elevator system corresponding to the wireless signal device; and generating, on the basis of the obtained elevator identifier, the authorization request information containing the terminal identifier of the personal mobile terminal and the elevator identifier of the corresponding elevator system obtained by the personal mobile terminal.

The authorization request method according to one embodiment of the present invention, wherein the step of obtaining the elevator identifier includes obtaining the elevator identifier broadcasted by the wireless signal device through a shaking operation of the personal mobile terminal.

The authorization request method according to another embodiment or any of the above embodiments of the present invention, wherein the step of obtaining the elevator identifier includes triggering the personal mobile terminal to perform a wireless signal scanning operation when the shaking operation occurs so as to obtain the elevator identifier broadcasted by the wireless signal device.

The authorization request method according to another embodiment or any of the above embodiments of the present invention further comprises the step of determining whether the elevator system corresponding to the currently obtained elevator identifier has been authorized based on the authorization result stored in the personal mobile terminal, and, in the case of determining that authorization has been granted, not generating or sending authorization request information corresponding to the currently obtained elevator identifier.

According to a fourth aspect of the present invention, a computer-readable storage medium is provided, on which computer programs are stored, wherein said programs can be executed by a processor to implement steps of any one of aforesaid authorization request method.

The above features and operations of the present invention will become more obvious from the following descriptions and drawings.

BRIEF DESCRIPTION OF THE DRAWINGS

The above and other objects and advantages of the present invention will become clearer and more complete from the following detailed descriptions given in conjunction with the drawings, wherein the same or similar elements are denoted by the same reference sign.

DETAILED DESCRIPTION OF THE EMBODIMENTS OF THE INVENTION

Figure 1:
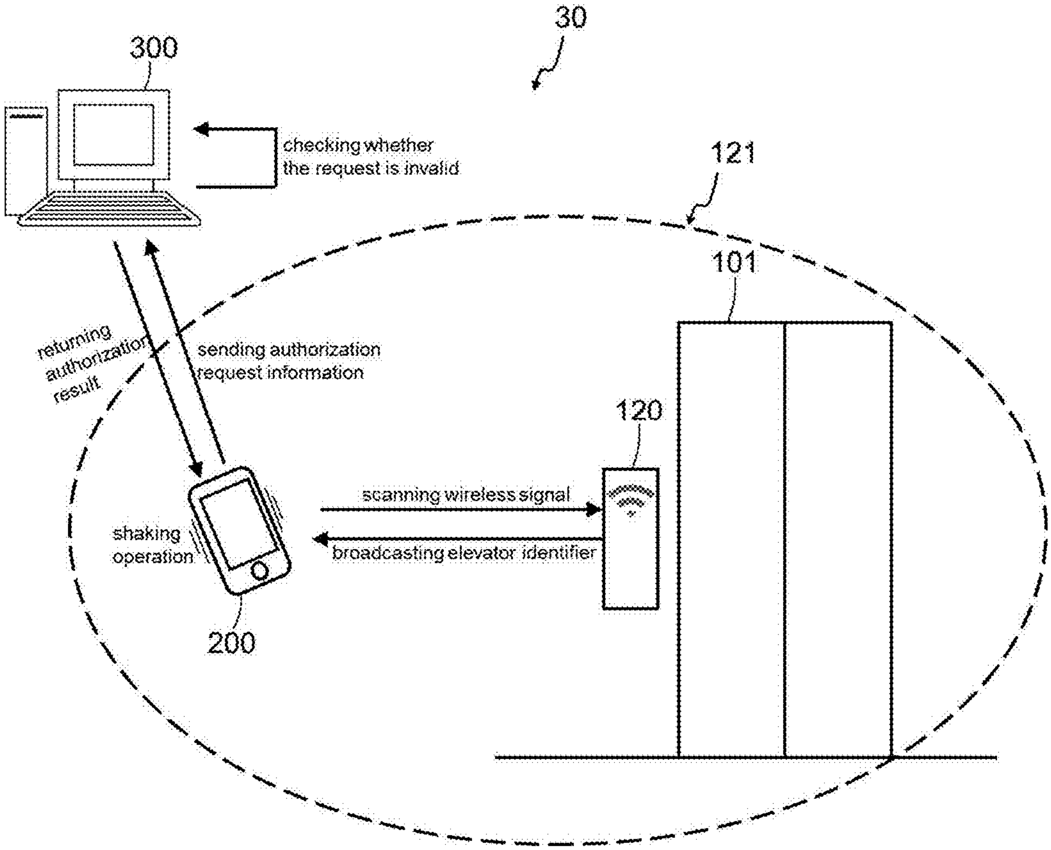
FIG. 1 is a schematic diagram of an authorization management system according to an embodiment of the present invention, wherein an authorization management device for an elevator service request according to an embodiment of the present invention is used.

The present invention will now be described more fully with reference to the accompanying drawings, which show exemplary embodiments of the present invention. However, the present invention can be implemented in many different forms and should not be construed as being limited to the embodiments described herein. Conversely, the embodiments are merely provided for making the present disclosure thorough and complete and for fully convey the concept of the present invention to those skilled in the art.

Some of the block diagrams shown in the drawings are functional entities and do not necessarily correspond to physically or logically independent entities. These functional entities may be implemented in software form, or in one or more hardware modules or integrated circuits, or in different processing devices and/or micro-controller devices.

The applicant noted that the existing authorization process described in the background technology is complex and inflexible, which makes it difficult for administrators to manage the elevator system, besides, the administrators cannot conveniently operate and have a heavy workload, and the passenger experience is relatively worse, so there is a need for improvement in the authorization of elevator service requests.

Figure 2:
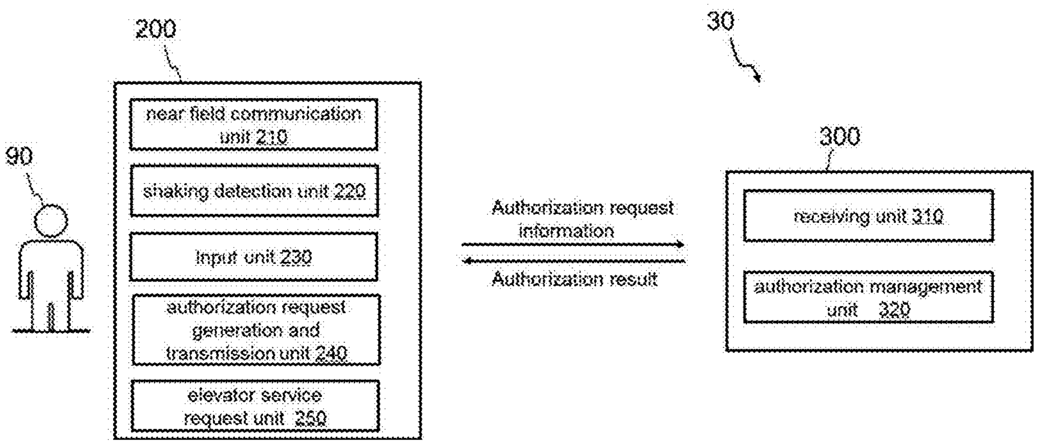
FIG. 2 is a schematic diagram of modular structures of a personal mobile terminal and an authorization management device used by an authorization management system according to an embodiment of the present invention.

FIG. 1 is a schematic diagram of an authorization management system according to an embodiment of the present invention, wherein an authorization management device for an elevator service request according to an embodiment of the present invention is used; FIG. 2 is a schematic diagram of modular structures of a personal mobile terminal and an authorization management device used by an authorization management system according to an embodiment of the present invention. Now an authorization management system 30 and an authorization management device 300 of an embodiment of the present invention will be described in detail with reference to FIG. 1 and FIG. 2.

The authorization management system 30 of the embodiment of the present invention can manage elevator systems 101 installed or operated in multiple buildings (e.g. a certain residential quarter), such as managing the right of a passenger 90 accessing the corresponding elevator system, and/or managing the right of a personal mobile terminal 200 of the passenger 90 to automatically send an elevator service request to the elevator system 101.

It shall be understood that in this application, each elevator system can be distinguished or identified by the corresponding elevator identifier. For example, the elevator systems of different buildings in one residential quarter are assigned corresponding elevator identifiers by the administrators; of course, different elevators in the same elevator system can also be distinguished by different elevator identifiers as desired. The elevator identifiers can be uniformly coded, and the elevator identifier assigned to each elevator system or elevator can be pre-stored in, for example, the authorization management device 300 of the authorization management system 30.

As shown in FIGS. 1 and 2, for each elevator system 101, a corresponding wireless signal device 120 is installed. For example, the wireless signal devices 120 are installed in respective elevator landing areas of the elevator system 101, and can broadcast corresponding wireless signals, so that wireless signals emitted or broadcasted by the wireless signal device 120 can effectively cover at least each elevator landing area. FIG. 1 shows a coverage 121 of the wireless signals broadcasted by the wireless signal device 120, and once the personal mobile terminal 200 carried by the passenger 90 enters the coverage 121, the wireless signals can be sensed.

In one embodiment, the wireless signal device 120 can be a Bluetooth module, which can specifically be a Bluetooth Low Energy (BLE) module, for example; correspondingly, the wireless signals emitted or broadcasted by the wireless signal device 120 can be Bluetooth signals (e.g. BLE signals). The wireless signal device 120 can also be used to establish a wireless connection with the personal mobile terminal 200 carried by the passenger 90 to receive elevator service request commands from the personal mobile terminal 200, thus enabling the passenger 90 to make the elevator service request (e.g. elevator calling request) through the personal mobile terminal 200 without performing any operation.

In one embodiment, the authorization management system 30 broadcasts the elevator identifier of the corresponding elevator system 101 using the wireless signal device 120, the authorization management system 30 also obtains the elevator identifier broadcasted by wireless signal device 120 through the personal mobile terminal 200 carried by the passenger 90, for example, the personal mobile terminal 200 obtains the elevator identifier by scanning the wireless signals. Thus, the personal mobile terminal 200 can easily obtain the elevator identifier, for example, when the passenger 90 enters the wireless signal coverage 121, the elevator identifier can be obtained by means of automatic sensing; moreover, it is possible for multiple personal mobile terminals 200 to obtain the same elevator identifier almost simultaneously in, for example, the same landing area, thus there is no need of queuing as in the case of obtaining the elevator identifier (e.g. in the form of QR code) by scanning with the personal mobile terminals 200; besides, compared to obtaining the elevator identifier (e.g. in the form of QR code) by scanning with the personal mobile terminals 200, obtaining the elevator identifier by scanning wireless signals is not affected by environment, such as light, etc.

In one embodiment, as shown in FIG. 1, the authorization management system 30 obtains the elevator identifier broadcasted by the wireless signal device 120 through shaking operation of the personal mobile terminal 200. For example, if the passenger 90 wants to initiate an authorization request, he/she can obtain the elevator identifier broadcasted by the wireless signal device 120 by a shaking operation of the personal mobile terminal 200, so it is very easy for the passenger 90 to operate and the experience is good, and it is very easy for users to accept and remember.

The personal mobile terminals 200 can be a variety of intelligent terminals with a wireless communication function (such as Bluetooth communication function), which are convenient for passengers 90 to carry. The personal mobile terminal 200 may be provided with a memory, a processor having a computing function, etc., specifically, the personal mobile terminal 200 can be a smart phone, a wearable smart device (such as smart hand ring), a personal digital assistance (PAD) and so on, on which corresponding applications or components (such as APPs) are installed to achieve functions like authorization request and/or elevator service request.

In one embodiment, as shown in FIG. 2, a near field communication unit 210 is provided in the personal mobile terminal 200, through which the personal mobile terminal 200 automatically senses the wireless signals broadcasted by the wireless signal device 120 installed in the corresponding elevator system 101, and scans the wireless signal to obtain the elevator identifier therein.

In the case where the wireless signal device 120 is also used to establish a wireless connection with the personal mobile terminal 200 and receive elevator service request commands from the personal mobile terminal 200, the near field communication unit 210 can establish corresponding wireless communication (e.g. Bluetooth connection) with the first wireless signal device 120 under predetermined conditions, so that it can interact with the wireless signal device 120 in the elevator system, such as sending an elevator service request command (e.g. elevator service request command for calling the elevator); furthermore, an elevator service request unit 250 is provided in the personal mobile terminal 200, which is configured to automatically send the corresponding elevator service request command to the wireless signal device in elevator system 10 under predetermined conditions (e.g., when a signal strength value is greater than or equal to a corresponding threshold), so that the passenger 90 can make an elevator calling request, for example, without performing any operation.

The elevator service request command generated by the elevator service request unit 250 may include a starting floor or it may include the starting floor and/or destination floor. The elevator service request command generated by the elevator service request unit 250 can be sent, through the near field communication unit 210, to the wireless signal device 120 with which the near field communication unit 210 has established wireless communication.

For the authorization management system 30 or the elevator administrators, the right to elevator service request of the personal mobile terminal 200 is likely to be limited according to the need of management, that is to say, authorization of elevator service requests of the personal mobile terminal 200 needs to be managed. For example, for passengers 90 who live in the ninth floor of building No. 10 of a residential quarter, their personal mobile terminals 200 are only authorized for making elevator service requests for the elevator system of building No. 10 of the residential quarter, or are only authorized for making elevator service requests on the first and ninth floors of building No. 10 of the residential quarter.

Still referring to FIG. 2, in one embodiment, the personal mobile terminal 200 according to the embodiment of the present invention has a shaking detection unit 220, which can be realized by a sensor, for example, and the shaking detection unit 220 can detect the shaking operation, thereby determining whether a shaking operation occurs currently on the personal mobile terminal 200. When the shaking detection unit 220 determines that the shaking operation has occurred, it enables the near field communication unit 210 to scan and detect the wireless signals and obtain the elevator identifier.

Still referring to FIG. 2, in one embodiment, the personal mobile terminal 200 is also provided with an input unit 230, which can be used to input at least information of the floor for which authorization is requested. Other information can also be input through the input unit 230, such as an ID number that serves as the identity certificate information of the passenger 90, and information input through the input unit 230 can be pre-stored in the personal mobile terminal 200.

Still referring to FIG. 1, in one embodiment, the personal mobile terminal 200 is also provided with an authorization request generation and transmission unit 240, which is configured to generate and send authorization request information, which includes the obtained elevator identifier and the terminal identifier of the personal mobile terminal 200 mapped to the elevator identifier. The terminal identifier of the personal mobile terminal 200 can identify the personal mobile terminal 200, thereby identifying the passenger 90 using the personal mobile terminal 200; the terminal identifier can specifically be a communication number (e.g. a mobile phone number when the personal mobile terminal 200 is a mobile phone), the terminal identifier can also be the unique identification code of the personal mobile terminal 200, or even the ID of the passenger 90 who uses the personal mobile terminal 200.

In an embodiment, the authorization request generation and transmission unit 240 is further configured to establish a mapping relationship between the obtained elevator identifier and the terminal identifier of the personal mobile terminal 200 so that the terminal identifier is mapped to the elevator identifier, or the elevator identifier is mapped to the terminal identifier, for example, a mapping relationship is established between the elevator identifier obtained by scanning wireless signals and the communication number of the personal mobile terminal 200, thus constituting the corresponding authorization request information. It shall be understood that when the terminal identifier is mapped to the elevator identifier, the elevator identifier is also mapped to the terminal identifier, and a mapping relationship is established therebetween to facilitate subsequent authorization management.

In an embodiment, the generated authorization request information may include the floor for which authorization is requested as input through an input interface, and it may also include the identity certificate information (e.g., identity card, employee card, etc.) of the passenger 90. The identity certificate information can be stored in the personal mobile terminal 200 in advance, and of course, it can also be obtained instantaneously through, for example, the input unit 230 and/or an obtaining unit 220. The identity certificate information can help the administrators to quickly determine whether authorization should be allowed or not based on the authorization request information.

The personal mobile terminal 200 can establish communication connection with the authorization management device 300 through various types of wireless networks, so that the authorization request generation and transmission unit 240 of the personal mobile terminal 200 can send the authorization request information to the authorization management device 300 corresponding to the elevator system 10 in real time.

Still referring to FIG. 1 and FIG. 2, the authorization management device 300 can be implemented through various types of computer devices, for example, through a cloud server. The authorization management device 300 can be installed in a building or in other places remotely, and its location is not restrictive. Authorization management of multiple elevator systems 101 can be realized through one authorization management device 300. In one embodiment, the authorization management device 300 can be set in the property management system of the building where the elevator system is located so as to facilitate the property management personnel to manage authorization of elevator service requests.

The authorization management device 300 may be equipped with a receiving unit 310 configured to receive authorization request information from each mobile terminal 200 (e.g. the authorization request information being transmitted through the communication connection established between the personal mobile terminal 200 and the authorization management device 300), so that the authorization request information is processed in the authorization management device 300 collectively.

The authorization management device 300 is also equipped with an authorization management unit 320, which is configured to determine whether the authorization request information from the corresponding personal mobile terminal 200 is allowed to be authorized at least according to the mapping relationship between the elevator identifier and the terminal identifier of the personal mobile terminal 200 in the authorization request information.

In one embodiment, as shown in Table 1 below, the authorization management unit 320 is further configured to display multiple pieces of authorization request information in a table as shown in Table 1, which facilitates administrators to learn about the authorization request information and facilitates manual authorization operations.

TABLE 1

| Elevator Identifier | Floors for which authorization is requested | Terminal identifier | Time of Requesting | Authorization Operation |
|---|---|---|---|---|
| 10-A | 1 ⇒ 9 | 130XXXXXXXX | 2017 Oct. 31 | ☑☒ |
| 10-B | B1 ⇒ 9 | 131XXXXXXXX | 2017 Oct. 31 | ☑☒ |
| 01-C | 9 ⇒ 1 | 132XXXXXXXX | 2017 Oct. 31 | ☑☒ |
| 20-D | 1 ⇒ 12 | 133XXXXXXXX | 2017 Oct. 30 | ☑☒ |
| 20-A | 7 ⇒ 11 | 134XXXXXXXX | 2017 Oct. 29 | ☑☒ |

Figure 3:
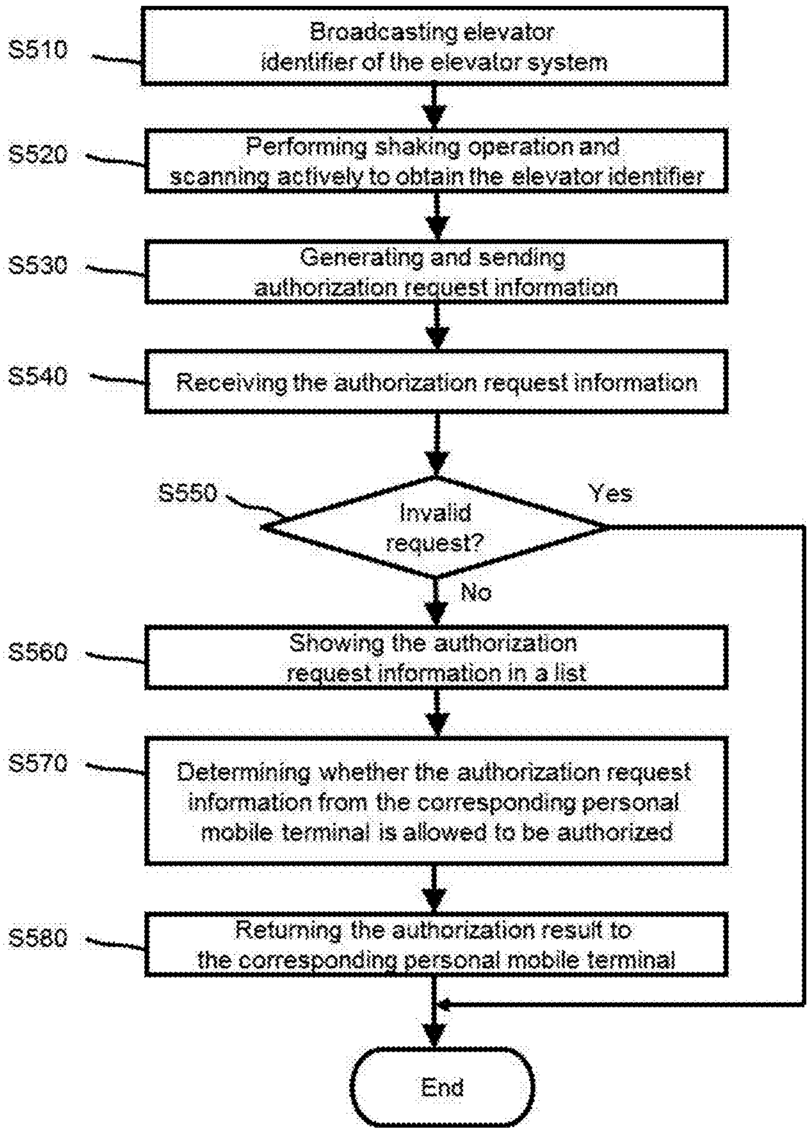
FIG. 3 is a flow chart of an authorization management method for an elevator service request according to an embodiment of the present invention.

As shown in Table 1, the "elevator identifier" and "terminal identifier" in the authorization request information are corresponding or mapping to each other in the same row, and the authorization request information further include the "floors for which authorization is requested", the "time of requesting", etc., which are all presented in the form of a table. Take the first row as an example, 10-A refers to elevator A of building No. 10 of a residential quarter, which is broadcasted by the wireless signal device 120 corresponding to elevator A; "1⇒9" refer to the input floors for which authorization is requested as shown in FIG. 3, i.e. the first and ninth floors; "130XXXXXXXX" is the communication number of the personal mobile terminal 200, and it represents the terminal identifier; "2017-10-31" refers to the time of requesting.

It should be noted that the arrangement of the authorization request information in the table is not limited to the example in Table 1. For example, the authorization request information can be arranged according to the sequence of the time of requesting, the authorization request information corresponding to the same elevator system or the same elevator can be sorted and arranged together, or the authorization request information can be sorted and arranged according to the terminal identifiers or the floors for which authorization is requested.

Still referring to FIG. 2, the authorization management unit 320 can be configured to determine whether authorization request information is allowed to be authorized based on any of the following authorization methods: (a) fully automatically allowing authorization or fully automatically denying authorization, (b) automatically allowing authorization or automatically denying authorization batch by batch, (c) allowing or denying authorization completely based on manual inputs.

In one embodiment, in conjunction with Table 1, the authorization management unit 320 is configured to display multiple pieces of authorization request information by way of a table (e.g., Table 1) when determining whether the authorization request information is allowed to be authorized based on the authorization method (c). There is a column of "authorization operation" in the table, which includes icons (e.g. "□" and "□") that correspond to each piece of authorization request information and that can be clicked or activated by manual inputs, and administrators can operate on the column of "authorization operation" to allow or deny authorization of the authorization request information in the corresponding rows, for example, clicking or activating "□" means authorizing the authorization request information, and clicking or activating "□" means not authorizing the authorization request information, i.e. not authorizing the current request of the personal mobile terminal 200. Specifically, if the elevator or elevator system or elevator group needs access restriction for each personal mobile terminal, the authorization management unit 320 can use the authorization method (c) of the above example to manage authorization, thus ensuring security and reliability of the authorization management.

In another embodiment, the authorization management unit 320 may be configured to automatically allow authorization/automatically deny authorization of all authorization request information when determining whether the authorization request information is allowed to be authorized based on authorization method (a). Specifically, if there is no access restriction for the elevator or elevator system or elevator group, the authorization management unit 320 can be configured to use the fully automatically allowing authorization as in authorization method (a); or if there is a restriction for not allowing access for the elevator or elevator system or elevator group at the current time, the authorization management unit 320 can be configured to use the fully automatically denying authorization as in authorization method (a). Thus the efficiency of authorization operations is greatly improved and the workload of administrators is reduced.

In still another embodiment, the authorization management unit 320 may be configured to automatically allow authorization/automatically deny authorization of authorization request information of certain batch when determining whether the authorization request information is allowed to be authorized based on authorization method (b), thereby at least realizing partial automatic allowing of authorization/automatic denying of authorization, which can also help to improve the efficiency of authorization operations and reduce the workload of administrators, while giving consideration to security and reliability of access management. When the authorization method (b) is used, a list of first terminal identifiers of the personal mobile terminals 200 that are used for automatically allowing authorization batch-by-batch and/or a list of second terminal identifiers of the personal mobile terminals 200 that are used for automatically denying authorization batch-by-batch can also be obtained. For instance, the list of first terminal identifiers of the personal mobile terminals 200 that are used for automatically allowing authorization batch-by-batch can be browsed and obtained from the authorization management device 300, which pre-stores said list of first terminal identifiers. Specifically, the list of first terminal identifiers contains terminal identifiers (e.g. communication numbers) of personal mobile terminals 200 that do not have restrictions for access to, for example, a certain elevator or all elevators, such that in the authorization management unit 320, the authorization request information corresponding to the terminal identifiers in the list of first terminal identifiers can all be allowed to be authorized in bulk; and for the list of the second terminal identifiers, the same exemplified operation can be performed.

It shall be understood that as for the remaining authorization request information that are not processed by authorization method (b), they can be handled manually by authorization method (c). In one embodiment, after determining whether the authorization request information is allowed to be authorized based on authorization method (a) or authorization method (b), if administrators need to manually verify or update the authorization request information for which the determination of whether authorization is allowed has been made, they can continue to use authorization method (c) to manually update at least some of the authorization request information that have been determined based on authorization method (a) or authorization method (b) to determine whether they are allowed to be authorized.

It should be noted that the authorization management unit 320 is further configured to use different authorization methods for different elevators or different elevator systems or different elevator groups. For example, the authorization method (a) is used for the authorization request information for elevators corresponding to a predefined elevator group M, the authorization method (b) is used for the authorization request information for elevators corresponding to a predefined elevator group N, and the authorization method (c) is used for the authorization request information for elevators corresponding to a predefined elevator group F.

Still referring to FIGS. 1 and 2, after the authorization operation is completed in the authorization management device 300, the authorization management device 300 will return an "authorization result" to the personal mobile terminal 200, such as authorization allowed or authorization not allowed. The personal mobile terminal 200 can display and present the authorization result.

As an example, if the authorization request information in the first row of Table 1 sent by the personal mobile terminal 200 is allowed to be authorized, the personal mobile terminal 200 will be granted the right to automatically make elevator service requests on the first and ninth floors of the elevator system 101*a*, such as automatically sending elevator service request commands indicating elevator calling operations.

In one embodiment, as shown in FIG. 2, the personal mobile terminal 200 can also store the authorization result, and the authorization request generation and transmission unit 240 of the personal mobile terminal 200 also determines whether the elevator system corresponding to the currently obtained elevator identifier has been authorized based on the stored authorization result, and does not generate or send the authorization request information corresponding to the currently obtained elevator identifier if the elevator system has been authorized, thus avoiding repeated requests.

In one embodiment, as shown in FIG. 1, the authorization management unit 320 of the authorization management device 300 is also used to determine whether the received authorization request information is an invalid request; for example, if the requests are repeated requests for the same terminal identifier and the same elevator identifier, they will be determined as invalid requests, or for example, if the authorization request information contains elevator identifiers of non-operating elevator systems or floor information that is not within the operation range of the corresponding elevator system, then said authorization request information can also be determined as invalid request. If the invalid request is confirmed, the authorization management unit 320 can filter out the invalid request, for example, the invalid authorization request information will not be presented in Table 1, thus avoiding invalid authorization operations.

It will be understood that if the authorization request information does not include the floors requesting authorization, the personal mobile terminal 200 will be granted the right to request elevator service on each floor of the elevator system 101.

The authorization management system 30 of the above embodiment can easily obtain the elevator identifiers through the personal mobile terminal 200, and the generation and transmission of the authorization request information are convenient, which greatly improves the experience of the processing of elevator authorization requesting. Moreover, mapping data between the elevator identifiers and the terminal identifiers can also be generated by the personal mobile terminal 200, correspondingly, the authorization management device 300 can easily know the mapping data between the elevator identifiers and the terminal identifiers through the authorization request information, thus it is easy to know which elevator should be authorized to which passenger, and management of the access rights to the elevator system can be easily realized and the authorization operations can also be easily presented. In particular, the authorization management system 30 of the above example does not need a face-to-face authorization for each passenger 90, and the whole authorization requesting process and authorization management process are short, convenient and efficient.

FIG. 3 is a flow chart of an authorization management method for an elevator service request according to an embodiment of the present invention. In the authorization management method of the embodiment, an authorization request method that can be performed in the personal mobile terminal 200 according to an embodiment is further shown.

The authorization management method and the authorization request method will be demonstrated below with reference to FIGS. 1 to 3.

In step S510, the elevator identifier of the elevator system 101 corresponding to the wireless signal device 120 is broadcasted by the wireless signal device 120.

In step S520, the elevator identifier broadcasted by the wireless signal device is obtained by the personal mobile terminal 200. In this step, the personal mobile terminal 200 can automatically obtain the elevator identifier of the elevator corresponding to the elevator system 101. In another embodiment, if the passenger 90 wants to have access to a certain elevator system, i.e. to obtain authorization for sending elevator service request commands to the wireless signal device 120 of the elevator system 101, the passenger 90 can actively obtain the elevator identifier broadcasted in real time by the wireless signal device 120 through shaking operation of the personal mobile terminal 200, thus obtaining the elevator identifier of the elevator system 101*a*. For example, the personal mobile terminal 200 can trigger the personal mobile terminal to perform a wireless signal scanning operation when the shaking operation occurs so as to obtain the elevator identifier broadcasted by the wireless signal device 120; such way of obtaining the elevator identifier can give the user a very good experience.

In this step, the personal mobile terminal 200 can sense the wireless signals broadcasted by multiple wireless signal devices 120, and the personal mobile terminal 200 can arrange the elevator identifiers obtained according to intensities of the sensed multiple wireless signals, and the elevator identifier of the wireless signal with the strongest signal intensity is used as the elevator identifier of the nearest elevator system for which the passengers 90 want to get authorization.

In step S530, the authorization request information is generated and sent. In this step, in order to avoid sending repeated authorization requests, it is determined whether the elevator system 101 corresponding to the currently obtained elevator identifier has been authorized based on the authorization results stored in the personal mobile terminal 200. In the case of determining that the elevator system 101 has been authorized, the authorization request information corresponding to the currently obtained elevator identifier will not be generated or sent.

In this step, a mapping relationship between the currently obtained elevator identifiers and the terminal identifiers can be established first, and then the authorization request information is generated, thus facilitating the authorization operations on the end of the authorization management device.

The above steps S520 to S530 demonstrate the main process of an authorization request, and by repeating said steps S520 to S530, multiple authorization requests can be made, for example, authorization requests for different floors of one elevator, authorization requests for different elevators, or even authorization requests for one elevator at different time periods (e.g. making authorization request again upon expiration of the authorization). It will be understood that the entire authorization requesting process is simple and convenient and gives passengers good experiences.

Further, in step S540, authorization request information from one or more personal mobile terminals 200 are received.

In step S550, it is determined whether the authorization request information is an invalid request, if "yes", the authorization request information will be filtered out and the authorization management process will be ended, if "no", step S560 will be performed.

In step 560, the authorization request information is shown in a list, for example, multiple pieces of authorization request information are shown in a list through Table 1 as mentioned above, for example. The mapping relationship between the elevator identifier and the terminal identifier will also be presented directly in front of the administrators, so that the administrators can easily perform authorization operations according to the available information.

In step S570, it is determined whether the authorization request information from the corresponding personal mobile terminal is allowed to be authorized; in this step, each piece of authorization request information is authorized manually one by one based on the authorization method (c) that has been determined to be used, i.e., allowing authorization or denying authorization entirely based on manual input. For example, by operating on the column of “authorization operation” in Table 1, the administrator can allow or deny authorization of the authorization request information in the corresponding row, i.e. clicking or activating “D” means allowing authorization of the authorization request information, and clicking or activating “D” means denying authorization of the authorization request information. During manual operation, at least according to the mapping relationship between the elevator identifier in the authorization request information and the terminal identifier of the personal mobile terminal 200, it is determined whether the authorization request information from the corresponding personal mobile terminal is allowed to be authorized. For example, as shown in the first row of Table 1, it can be determined whether an authorization of allowing the elevator service request should be granted for the elevator identifier “10-A” corresponding to the terminal identifier 200 according to information about the terminal identifier 200 stored in the authorization management device 300, if authorization is allowed, “□” is activated in the “authorization operation” column, and if not, “□” is activated in the “authorization operation” column.

In step S580, the authorization result is returned to the corresponding personal mobile terminal 200. The personal mobile terminal 200 can present the authorization result to passengers or store the authorization result as an existing authorization result.

So far, the process of the method of performing authorization management by manual input of the administrators is basically completed.

It shall be understood that the authorization management method for elevator service requests in the above examples can be carried out for one or a batch of authorization request information. The whole authorization management process is simple and efficient, and the administrators can conveniently carry out authorization management operations.

It should be noted that the personal mobile terminal 200 in the above embodiments of the present invention can be implemented by computer program instructions, for example, through dedicated APPs, and these computer program instructions can be provided to processors of general purpose computers, dedicated computers or other programmable data processing devices to constitute the personal mobile terminal 200 of the embodiments of the present invention, besides, units or components for realizing functions/operations specified in the flow charts and/or blocks and/or one or more flow block diagrams can be created by said instructions that are executed by the processors of the computers or other programmable data processing devices.

It should be noted that the authorization management device 300 in the above embodiments of the present invention can be implemented by computer program instructions, for example, through dedicated computer programs, and these computer program instructions can be provided to processors of general purpose computers, dedicated computers or other programmable data processing devices to constitute the authorization management device 300 of the embodiments of the present invention, besides, units or components for realizing functions/operations specified in the flow charts and/or blocks and/or one or more flow block diagrams can be created by said instructions that are executed by the processors of the computers or other programmable data processing devices.

Moreover, said computer program instructions can be stored in a computer-readable memory and can instruct the computers or other programmable processors to achieve functions in a specific way, so that these instructions stored in the computer-readable memory form a product that includes instruction components for realizing functions/operations specified in one or more blocks of the flow chart and/or block diagram.

It shall also be noted that in some optional implementations, the functions/operations shown in the blocks may not take place in the order shown in the flow chart. For example, two blocks shown in turn may actually be concurrently implemented or they may be implemented in an inverted order sometimes, depending on the functions/operations involved.

It shall be noted that the elements disclosed and depicted herein (including flow charts and block diagrams in the drawings) refer to the logical boundaries between the elements. However, according to software or hardware engineering practice, the described elements and their functions can be implemented on a machine through a computer-executable medium, which has a processor capable of executing program instructions stored thereon, said program instructions acting as a monolithic software structure, an independent software module, or a module using external programs, codes, services, etc., or as any combination thereof, and all of these implementation schemes may fall within the scope of the present disclosure Although different non-restrictive embodiments have specifically described components, the embodiments of the present invention are not limited to these specific combinations. Some of the components or features from any non-restrictive embodiment may be combined with components or features from any other non-restrictive embodiment.

Although specific orders of steps are shown, disclosed and required, it should be understood that the steps can be performed, separated or combined in any order, unless otherwise specified, and will still benefit from the present disclosure.

The foregoing descriptions are illustrative rather than restrictive. Various non-restrictive embodiments are disclosed herein, however, those skilled in the art will understand that, according to the above teachings, various modifications and changes will fall within the scope of the appended claims. Therefore, it will be understood that disclosure other than the specific disclosure may be implemented within the scope of the appended claims. For this reason, the appended claims should be read to determine the true scope and content.

What is claimed is:

1. A system for authorization management of an elevator service request, comprising:

a wireless signal device for broadcasting an elevator identifier of a corresponding elevator system; and an authorization management device;

wherein the system for authorization management obtains the elevator identifier broadcasted by the wireless signal device through a personal mobile terminal; the authorization management device is used to receive authorization request information from the personal mobile terminal, the authorization request information containing a terminal identifier of the personal mobile terminal and the elevator identifier of the corresponding elevator system obtained by the personal mobile terminal;

wherein said system for authorization management obtains the elevator identifier broadcasted by the wireless signal device through a shaking operation of the personal mobile terminal.

2. The system for authorization management according to claim 1, wherein the personal mobile terminal triggers a wireless signal scanning operation when the shaking operation occurs so as to obtain the elevator identifier broadcasted by the wireless signal device.

3. The system for authorization management according to claim 1, wherein the authorization management device comprises:

a receiving unit configured to receive the authorization request information from one or more personal mobile terminals, wherein the authorization request information contain the elevator identifier and the terminal identifier of the personal mobile terminal mapped to the elevator identifier; and an authorization management unit configured to determine whether the authorization request information from the corresponding personal mobile terminal is allowed to be authorized at least according to the mapping relationship between the elevator identifier and the terminal identifier in the authorization request information.

4. The system for authorization management according to claim 1, wherein the authorization management device is configured to be able to return an authorization result corresponding to the authorization request information to the personal mobile terminal.

5. The system for authorization management according to claim 4, wherein the personal mobile terminal stores the authorization result and is further used for determining whether the elevator system corresponding to the currently obtained elevator identifier has been authorized based on the authorization result and, in the case of determining that authorization has been granted, not generating or sending authorization request information corresponding to the currently obtained elevator identifier.

6. The system for authorization management according to claim 1, wherein the authorization management device is further used to determine whether the authorization request information is an invalid request.

7. The system for authorization management according to claim 1, wherein the wireless signal device is further used to establish a wireless connection with the personal mobile terminal to receive elevator service request commands from the personal mobile terminal.

8. A method for authorization management of an elevator service request, comprising the steps of:

broadcasting, by a wireless signal device, an elevator identifier of an elevator system corresponding to the wireless signal device;

obtaining the elevator identifier broadcasted by the wireless signal device through a personal mobile terminal; and receiving authorization request information from the personal mobile terminal, wherein the authorization request information contain a terminal identifier of the personal mobile terminal and the elevator identifier of the corresponding elevator system obtained by the personal mobile terminal;

wherein in the step of obtaining the elevator identifier, the elevator identifier broadcasted by the wireless signal device is obtained through the shaking operation of the personal mobile terminal.

9. The method for authorization management according to claim 8, which further comprises the step of:

generating and sending the authorization request information by the personal mobile terminal.

10. The method for authorization management according to claim 8, wherein the step of obtaining the elevator identifier includes triggering the personal mobile terminal to perform a wireless signal scanning operation when the shaking operation occurs so as to obtain the elevator identifier broadcasted by the wireless signal device.

11. The method for authorization management according to claim 8, which further comprises the step of:

determining whether the authorization request information from the corresponding personal mobile terminal is allowed to be authorized at least according to the mapping relationship between the elevator identifier and the terminal identifier in the authorization request information.

12. The method for authorization management according to claim 8, which further comprises the step of:

returning an authorization result corresponding to the authorization request information to the personal mobile terminal.

13. The method for authorization management according to claim 12, which further comprises the step of:

determining whether the elevator system corresponding to the currently obtained elevator identifier has been authorized based on the authorization result stored in the personal mobile terminal, and, in the case of determining that authorization has been granted, not generating or sending authorization request information corresponding to the currently obtained elevator identifier.

14. He method for authorization management according to claim 8, which further comprises the step of:

determining whether the authorization request information is an invalid request.

15. An authorization request method for an elevator service request, comprising the steps of:

obtaining, by a personal mobile terminal, an elevator identifier, broadcasted by a wireless signal device, of an elevator system corresponding to the wireless signal device; and generating, on the basis of the obtained elevator identifier, authorization request information containing the terminal identifier of the personal mobile terminal and the elevator identifier of the corresponding elevator system obtained by the personal mobile terminal;

wherein the step of obtaining the elevator identifier includes obtaining the elevator identifier broadcasted by the wireless signal device through a shaking operation of the personal mobile terminal.

16. The authorization request method according to claim 15, wherein the step of obtaining the elevator identifier includes triggering the personal mobile terminal to perform a wireless signal scanning operation when the shaking operation occurs so as to obtain the elevator identifier broadcasted by the wireless signal device.

17. The authorization request method according to claim 15, which further comprising the step of determining whether the elevator system corresponding to the currently obtained elevator identifier has been authorized based on the authorization result stored in the personal mobile terminal, and, in the case of determining that authorization has been granted, not generating or sending authorization request information corresponding to the currently obtained elevator identifier.

18. A non-transitory computer-readable storage medium, on which computer programs are stored, wherein said programs can be executed by a processor to implement steps of the authorization request method according to claim 15.

* * * * *